(No Model.)
A. COWAN.
FLOOD FENCE.
No. 395,770. Patented Jan. 8, 1889.
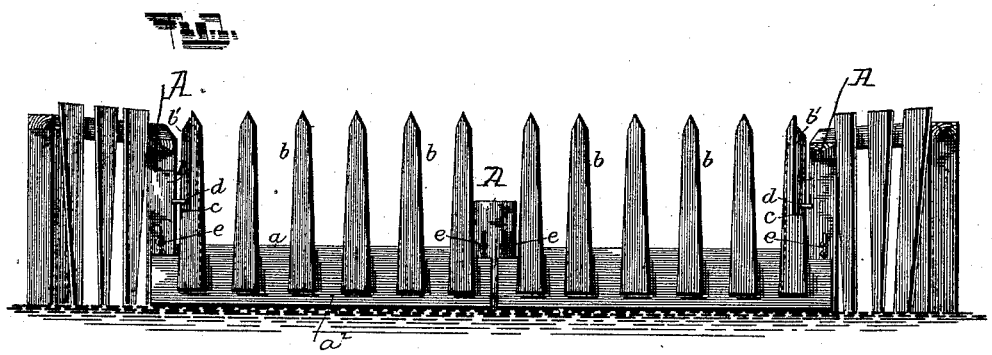
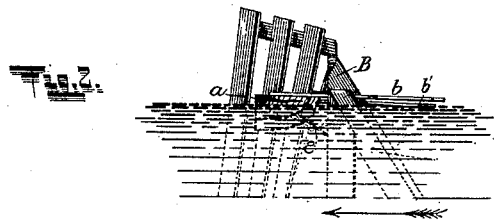
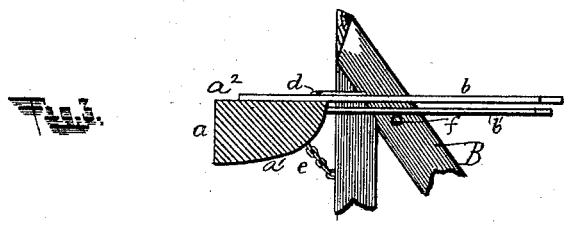
Witnesses,
Will A. Norton
Wm. H. Bates.
Inventor,
Alexander Cowan
By his Attorney, J. H. MacDonald

UNITED STATES PATENT OFFICE.

ALEXANDER COWAN, OF URBANA, OHIO.

FLOOD-FENCE.

SPECIFICATION forming part of Letters Patent No. 395,770, dated January 8, 1889.

Application filed April 9, 1887. Serial No. 234,279. (No model.)

*To all whom it may concern:*

Be it known that I, ALEXANDER COWAN, of Urbana, county of Champaign, State of Ohio, have invented certain new and useful Improvements in Flood-Fences, of which the following is a full and exact description, reference being had to the accompanying drawings, making part of this specification.

My invention relates to improvements in flood fences or gates, and has for its objects to provide a tilting or swinging gate or sectional fence that will readily yield to the pressure of water in case of flood, so that no obstruction will be offered to the passage of trash or débris carried by the water, and the danger of its forming a dam will be obviated.

The invention consists in the novel construction and arrangement of parts hereinafter described, and pointed out in the claim.

In the drawings, Figure 1 represents a front view of my improved flood-gate in position for use. Figs. 2 and 3 are side views, partly in section, showing the gate raised by high water and turned downstream.

A A represent posts planted a proper distance apart and braced downstream by the bars B, and between these posts are hinged the gate or fence sections, as hereinafter described. These sections are composed of a base log or bar, $a$, which is rounded on its inner face and squared on its outer face and also on its bottom, if desired, being preferably made on the segment of a circle in cross-section, the vertical face of the log facing normally upstream or against the current. Against the log or bar $a$ are secured, in a suitable manner, the lower ends of the pickets $b$, which form the fence or gate proper, and which stand vertically when the gate is in normal position, so that the passage of cattle through the gate is prevented.

Where more than one gate is employed the bars $a$ are only made long enough to extend from center to center of adjoining posts A, and are reduced and rounded at their ends on the faces adjoining the posts, as shown at $a'$, so that the gates or sections can turn toward these posts, the rounded ends preventing undue friction. These faces $a'$ also serve to protect the attaching devices of the gates to post A, which are as follows:

$e\ e$ designate short chains secured at their lower ends to the respective ends of bars $a$ at about the center of the height of the bar, and on the rounded faces thereof, as shown, the upper ends of the chains are connected to suitable staples in the faces of the post. Now, it should be observed that when the gates are down, as shown in Figs. 2 and 3, the center of gravity of the same is elevated by reason of the attachment of chains $e$, so that as soon as pressure is removed from the pickets the weight of bar $a$ will cause the return of the gate or gates to their normal position. By having the face $a^2$ of the log flat instead of round a more direct pressure is exerted by the water against the gate to turn the same, so that the gate will be lowered at a much less height of water than it would if the bars $a$ were round, as in that case the water-pressure would be exerted in such manner as to lift the gate before turning it, or the water would wash out below the bar, which it will not do when the face of the bar is flat, as described.

$b'$ designates vertical standards secured on the downstream side of bars $a$, at the end thereof adjoining posts A, and $d\ d$ designate angular arms or rods which are secured at one end to the sides of posts A and extend forward to a point between the pickets $b$ and standard $b'$ at the ends of the gate, where they take an angular horizontal bend between the picket and in front of the standard $b'$, so that when the gate is returned to its normal position after being forcibly displaced the standard $b'$ will be engaged by arm $d$ and the gate prevented from being turned past its proper stopping-point.

The pickets $b$, opposite standards $b'$, are suitably notched at $c$ to allow them to pass the arms of rods $d$; or, if preferred, the end pickets may be dispensed with, as the standard $b'$ will answer to close the gate at this point.

$f$ designates stop-arms or short rods secured to the posts A or brace-bars D in such position as to be struck by the standards $b'$ when the gate is turned down and hold the same, preventing the gates being turned entirely over and consequently broken.

Having thus described my invention, I claim—

The combination, with the posts A, having backwardly-projecting hooked arms $d$ and inwardly-projecting stop-pins $f$, of the gate composed of a base-bar, $a$, having flat vertical face $a^2$ and rounded ends $a'$, which rest against the posts, the pickets $b$, secured to the face of bar $a$, and the standards $b'$, secured at the ends of the bar $a$ in rear of the line of pickets, the bar $a$ being connected to the posts by flexible connections which permit it to turn, the hooked arms $d$ preventing backward movement of the gate past a vertical position, and the stop-pins $f$ preventing the gate from swinging forward past a horizontal position, substantially as shown and described.

In testimony whereof I affix my signature in presence of two witnesses.

ALEXANDER COWAN.

Witnesses:
JAMES TAYLOR,
THOS. BELL.